(12) United States Patent
Park et al.

(10) Patent No.: US 11,157,893 B2
(45) Date of Patent: Oct. 26, 2021

(54) ELECTRONIC DEVICE INCLUDING A PLURALITY OF PAYMENT MODULES

(71) Applicant: Samsung Electronics Co., Ltd., Gyeonggi-do (KR)

(72) Inventors: Su Young Park, Gyeonggi-do (KR); Da Som Lee, Seoul (KR); Yang Soo Lee, Gyeonggi-do (KR); Moon Soo Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 866 days.

(21) Appl. No.: 14/934,536

(22) Filed: Nov. 6, 2015

(65) Prior Publication Data

US 2016/0132865 A1    May 12, 2016

(30) Foreign Application Priority Data

Nov. 8, 2014 (KR) .................. 10-2014-0154819
Sep. 24, 2015 (KR) .................. 10-2015-0135617

(51) Int. Cl.
| | | |
|---|---|---|
| *G06Q 20/00* | (2012.01) | |
| *G06Q 20/32* | (2012.01) | |
| *H04B 5/00* | (2006.01) | |

(52) U.S. Cl.
CPC ....... *G06Q 20/3278* (2013.01); *H04B 5/0031* (2013.01)

(58) Field of Classification Search
CPC ................................................ G06Q 20/3278
USPC ........................................................ 705/39
See application file for complete search history.

(56) References Cited

U.S. PATENT DOCUMENTS

| | | | |
|---|---|---|---|
| 7,267,267 B2 | 9/2007 | Lowman et al. | |
| 7,792,759 B2 | 9/2010 | Sancta et al. | |
| 7,798,394 B2 | 9/2010 | Hill et al. | |
| 8,553,717 B2 | 10/2013 | Nakatsugawa et al. | |
| 8,594,730 B2 | 11/2013 | Bona et al. | |
| 8,770,476 B2 | 7/2014 | Hill et al. | |
| 8,814,046 B1* | 8/2014 | Wallner | H04L 1/0011 |
| | | | 235/449 |
| 8,814,052 B2 | 8/2014 | Bona et al. | |
| 8,929,812 B2 | 1/2015 | Gree | |
| 9,129,280 B2 | 9/2015 | Bona et al. | |
| 9,330,386 B2 | 5/2016 | Hill et al. | |
| 9,613,354 B2 | 4/2017 | Hill et al. | |

(Continued)

FOREIGN PATENT DOCUMENTS

| | | |
|---|---|---|
| CN | 101730907 A | 6/2010 |
| CN | 102160061 A | 8/2011 |

(Continued)

OTHER PUBLICATIONS

Technologies for Payment Fraud (Year: 2014).*

(Continued)

*Primary Examiner* — Bruce I Ebersman
(74) *Attorney, Agent, or Firm* — Cha & Reiter, LLC

(57) ABSTRACT

An electronic device comprising: a near field communication (NFC) module; a magnetic stripe data transmission (MST) module; and at least one processor functionally coupled to the NFC module and the MST module, wherein the processor is configured to: select at least one of the NFC module or the MST module; and transmit payment information to an external device by using the selected module.

15 Claims, 14 Drawing Sheets

(56) References Cited

U.S. PATENT DOCUMENTS

| | | | |
|---|---|---|---|
| 2004/0068472 A1 | 4/2004 | Sahota et al. | |
| 2005/0067488 A1 | 3/2005 | Lowman et al. | |
| 2007/0118483 A1 | 5/2007 | Hill et al. | |
| 2008/0126259 A1 | 5/2008 | Lowman et al. | |
| 2008/0126260 A1 | 5/2008 | Cox et al. | |
| 2009/0168807 A1 | 7/2009 | Nakatsugawa et al. | |
| 2010/0270374 A1 | 10/2010 | Hill et al. | |
| 2010/0325052 A1 | 12/2010 | Sahota et al. | |
| 2011/0154497 A1* | 6/2011 | Bailey, Jr. | G06F 21/577 726/25 |
| 2011/0165836 A1* | 7/2011 | Dixon | G06Q 20/32 455/41.1 |
| 2011/0263292 A1 | 10/2011 | Phillips | |
| 2012/0135681 A1* | 5/2012 | Adams | H04B 5/0025 455/41.1 |
| 2013/0226609 A1* | 8/2013 | Pourfallah | G07F 17/0092 705/2 |
| 2014/0073240 A1 | 3/2014 | Gree | |
| 2014/0081782 A1* | 3/2014 | Morris | G06Q 20/405 705/21 |
| 2014/0108786 A1* | 4/2014 | Kreft | G06Q 20/3825 713/156 |
| 2014/0246490 A1* | 9/2014 | Graylin | G06Q 20/3272 235/379 |
| 2014/0246492 A1* | 9/2014 | Hill | G06Q 20/40 235/380 |
| 2014/0249948 A1* | 9/2014 | Graylin | G06Q 20/385 705/21 |
| 2014/0269946 A1 | 9/2014 | Wallner | |
| 2014/0308930 A1* | 10/2014 | Tran | H04W 4/18 455/414.1 |
| 2015/0044966 A1* | 2/2015 | Shultz | H04B 5/0031 455/41.1 |
| 2015/0324788 A1 | 11/2015 | Graylin et al. | |

FOREIGN PATENT DOCUMENTS

| | | |
|---|---|---|
| CN | 102842193 A | 12/2012 |
| CN | 102968604 A | 3/2013 |
| JP | 2001-283162 A | 10/2001 |
| JP | 2009-157789 A | 7/2009 |
| KR | 10-1330962 B1 | 11/2013 |

OTHER PUBLICATIONS

European Search Report dated Sep. 28, 2017.
International Search Report, dated Feb. 18, 2016.
Chinese Search Report dated Apr. 26, 2020.
Chinese Search Report dated Mar. 1, 2021.

* cited by examiner

ELECTRONIC DEVICE INCLUDING A PLURALITY OF PAYMENT MODULES

CLAIM OF PRIORITY

This application claims the benefit under 35 U.S.C. § 119(a) of a Korean patent application filed on Nov. 8, 2014 in the Korean Intellectual Property Office and assigned Serial number 10-2014-0154819, and of a Korean patent application filed on Sep. 24, 2015 in the Korean Intellectual Property Office and assigned Serial number 10-2015-0135617, the entire disclosure of which are hereby incorporated by reference.

TECHNICAL FIELD

The present disclosure relates to electronic devices in general, and more particularly to an electronic device including a plurality of payment modules.

BACKGROUND

An electronic device such as a smartphone or a tablet provides a user with various functions. The electronic device performs a merchandise payment function as well as a call function and a media function. A user makes payment using the electronic device on on-line or on off-line (in instances in which the user makes a pay to purchase merchandise at a real shop or restaurant). The electronic device has a communication function for transmitting payment information to a receiving device.

For the off-line payment using an electronic device, payment information is transmitted using one communication manner. For example, an electronic device employs a near-field communication (NFC) manner for transmission of payment information or a near-field magnetic stripe data transmission (hereinafter referred to as "MST") for transmission of data using a card.

In instances in which a payment receiving device which receives payment information from the electronic device uses one communication manner, a user has to check and select communication manners which payment receiving devices support, thereby making it inconvenient for use to make a pay.

SUMMARY

According to aspects of the disclosure, an electronic device is provided comprising: a near field communication (NFC) module; a magnetic stripe data transmission (MST) module; and at least one processor functionally coupled to the NFC module and the MST module, wherein the processor is configured to: select at least one of the NFC module or the MST module; and transmit payment information to an external device by using the selected module.

According to aspects of the disclosure, an electronic device is provided comprising: a first communication module configured to use a first communication protocol; a second communication module configured to use a second communication protocol; and at least one processor functionally coupled to the first communication module and the second communication module, wherein the processor is configured to: select one of the first communication module or the second communication module, and transmit payment information to an external device via the selected communication module.

According to aspects of the disclosure, an electronic device comprising: a near-field communication (NFC) module configured to transmit or receive payment information; and a magnetic stripe data transmission (MST) module configured to selectively transmit the payment information to an external device.

According to aspects of the disclosure, a method for use in an electronic device which comprises a near-field communication (NFC) module and a magnetic stripe data transmission (MST) module, the method comprising: selecting at least one of the NFC module and the MST module; and transmitting payment information to an external device via the selected module.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
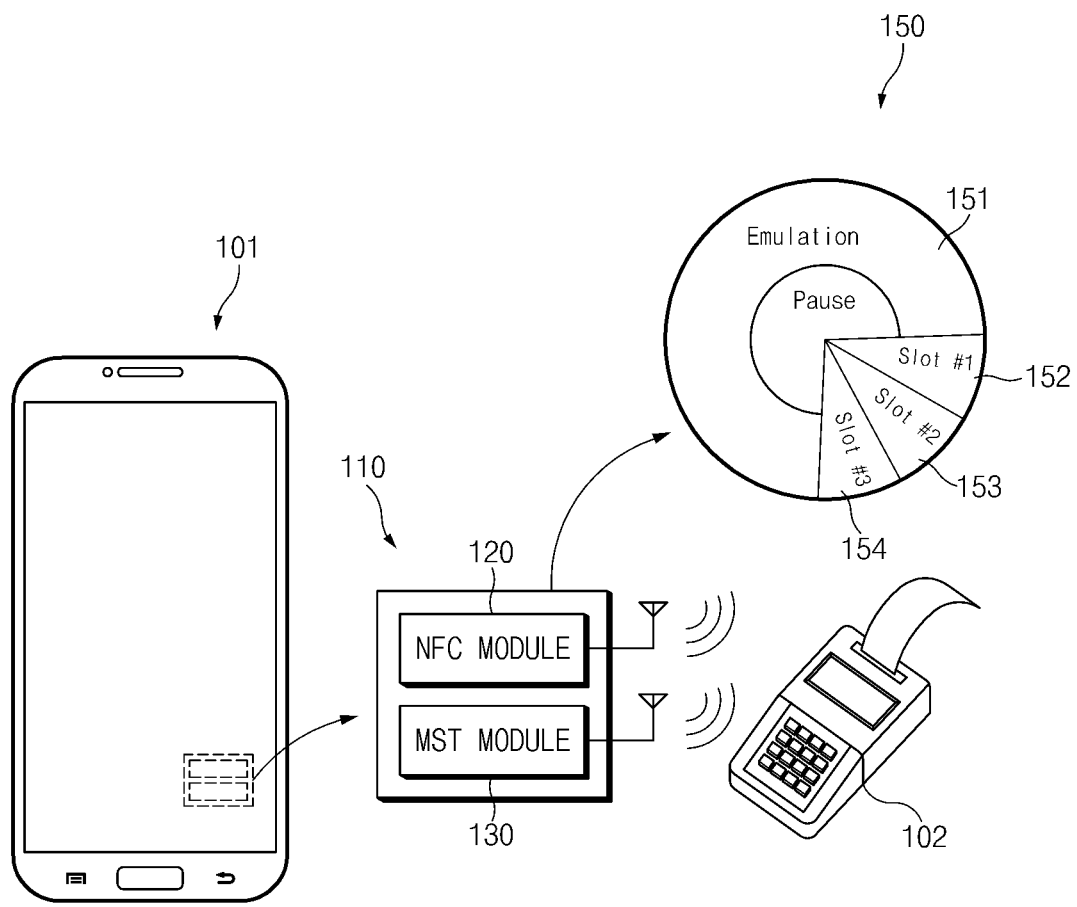
FIG. 1 is a diagram of an example of an electronic device, according to various embodiments of the present disclosure.
Figure 1:
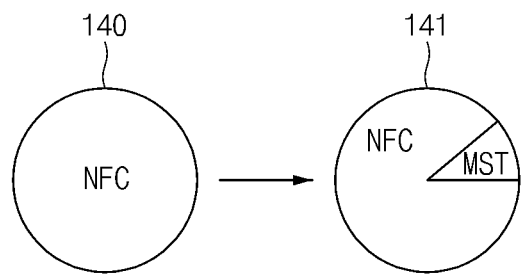

Various embodiments of the present disclosure may be described with reference to accompanying drawings. Accordingly, those of ordinary skill in the art will recognize that modifications, equivalents, and/or alternative various embodiments described herein can be variously made without departing from the scope and spirit of the present disclosure. With regard to description of drawings, similar components may be marked by similar reference numerals.

As used in the disclosure, the terms "have", "may have", "include" and "comprise", or "may include" and "may comprise" used herein indicate existence of corresponding features (e.g., elements such as numeric values, functions, operations, or components) but do not exclude presence of additional features.

As used in the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are intended to describe specified embodiments of the present disclosure without limiting the scope of the present disclosure. The terms of a singular form may include plural forms unless otherwise specified. Unless otherwise defined, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a diagram of an example of an electronic device according to various embodiments of the present disclosure.

Referring to FIG. 1, an electronic device 101 may include a communication module 110. The electronic device 101 may exchange data with an external device using the communication module 110 and may perform a call function, a media function, and the like.

The electronic device 101 may output transmission data to an external device via the communication module 110. The transmission data may be information stored in a storage module (not shown) which the electronic device 101 includes. The storage module may be embedded in the electronic device 101 or may be a storage space connected to the electronic device 101. According to various embodiments of the present disclosure, the transmission data may be data that a data generation module (not shown) included in the electronic device 101 generates based on the stored information. The transmission data that the data generation module generates may include secure data or payment information. The secure data may be obtained by encrypting data stored in the storage module.

The payment information may include a primary account number (PAN), a device account number (DAN), virtual credit card information, a bank information number (BIN), a card security code (CSC), a card verification value (CVV), or cryptogram. For example, the communication module 110 may include the data generation module.

According to various embodiments of the present disclosure, the electronic device 101 may execute payments for purchases of merchandise and services by using the communication module 110. For example, a user may transmit payment information using the electronic device 101 to pay for merchandise or services. Even though not holding a wallet or a credit card, the user may use the electronic device 101 such as a smartphone or a tablet in conjunction with a payment receiving device 102 (e.g., a point-of-sale terminal having a credit card reader) and may make a payment easily.

The electronic device 101 may provide the payment receiving device 102 with payment information such as a credit card number and/or any other suitable type of identifier that is needed to process a payment, such as a user name, or a bank account number. The electronic device 101 may perform a specific authentication procedure (e.g., password input, fingerprint recognition, and the like) while making a payment. The electronic device 101 may transmit payment information to the payment receiving device 102 using any suitable type of short-range communications protocol, such as Near-Field Communications (NFC), MST, Bluetooth, or the like, and the payment receiving device 102 may make payment based on the received payment information.

According to various embodiments of the present disclosure, the communication module 110 may include one or more sub-communication modules capable of performing off-line payment. The at least one or more sub-communication modules may include, for example, an NFC module 120 and an MST module 130. According to various embodiments of the present disclosure, another type of communication module which is different from the NFC module 120 and the MST module 130 may be used instead of at least one of the NFC module 120 or the MST module 130. According to various embodiments of the present disclosure, the NFC module 120 or the MST module 130 may be a circuit for communication.

For example, the NFC module 120 may support short-range communication with devices equipped with an NFC chip to perform bidirectional data communication at a specific frequency band (e.g., 13.56 MHz). The NFC module 120 may operate in a passive communication mode where the NFC module 120 is supplied with power from a magnetic field generated by an external device and establishes a channel or in an active communication mode where the NFC module 120 directly generates a power and establishes a channel.

The NFC module 120 may operate according to a specific transmission schedule. The transmission schedule may include any suitable type of data structure (or portion thereof) which identifies one or more time slots along with respective communication modules. Additionally or alternatively, the transmission schedule may include logic (e.g., software and/or hardware) for using specified communication modules to transmit payment information during different respective time slots.

In instances in which the NFC module 120 operates in the passive communication mode, the transmission schedule may be set to only include a passive NFC time slot. In instances in which the NFC module 120 operates in the active communication mode, the transmission schedule may be set to include a passive NFC time slot (e.g., a time slot in which payment information is transmitted using passive mode NFC) and an active NFC time slot (e.g., a time slot in which payment information is transmitted using active mode NFC). Thus, by using a particular transmission schedule, the electronic device 101 may be configured to sequentially operate in both of the passive communication mode and the active communication mode, or it may exclusively operate in the passive communication mode during a particular transmission period.

According to an embodiment of the present disclosure, if the electronic device 101 is configured to operate in both modes, the electronic device 101 may operate according to a transmission schedule that includes a passive communication time slot and an active communication time slot. As illustrated, a transmission schedule 150 may include a passive NFC time slot 151 associated with the passive communication mode of the NFC module 120 and active NFC time slots 152, 153, and 154 each being associated with the active communication mode of the NFC module 120.

During the passive NFC time slot 151, the electronic device 101 may transmit data to one or more external devices via passive mode NFC. In the passive NFC time slot 151, the electronic device 101 may be supplied with power from a magnetic field produced by an external device (e.g., the payment receiving device 102) and may transfer data through an established channel.

In the active NFC time slots 152, 153, and 154, the electronic device 101 may directly generate a magnetic field and may communicate with an external electronic device or with a card operating as an NFC device. For example, the time slot 152 may correspond to a mode in which data exchange with an electronic device existing at the outside is possible. In this case, the time slot 152 may correspond to, for example, a peer-to-peer (P2P) mode.

As another example, the time slot 153 may be a time slot in which a specific NFC-compatible protocol is used. For example, the protocol may be one of ISO/IEC 14443A/MIFARE, ISO/IEC 14443B, ISO/IEC 15693/ICODE, FeliCa, and JEWEL/TOPAZ. According to an embodiment of the present disclosure, in instances in which the electronic device 101 is configured to operate in both modes, the duration of the entire transmission period encompassed by the transmission schedule 150 may be one second.

According to various embodiments of the present disclosure, when the electronic device 101 is configured to exclusively use the passive communication mode, it may exclusively operate in the passive communication mode during the whole transmission period that is associated with the transmission schedule used by the device. In instances in which the electronic device is configured to exclusively operate in the passive communication mode, the transmission period may be one second in duration.

According to various embodiments of the present disclosure, the MST module 130 may be an NFC module which transmits data in a magnetic stripe data transmission mode, such as Magnetic Secure Transmission mode, hereinafter referred to as "MST mode". In the MST mode, a pulse may be generated according to transmission data and may be converted into a magnetic signal. To receive the data, the payment receiving device 102 may recover the data by detecting the magnetic signal, which is converted by an MST reader included in the payment receiving device 102, and converting the detected magnetic signal into an electrical signal.

The MST module 130 may receive a control signal and payment information from a control circuit in the electronic device 101. The MST module 130 may convert the payment information into a magnetic signal and may transmit the magnetic signal. For example, the MST module 130 may generate the same magnetic signal as the one which is detected when the magnetic stripe of a credit card is swiped in the payment receiving device 102. The payment receiving device 102 may recognize payment information output from the MST module 130 using a conventional credit card reader, in general. According to various embodiments of the present disclosure, the MST module 130 may provide the payment receiving device 102 with payment information through simplex communication. The configuration and operation of the MST module 130 are further discussed below with reference to FIG. 10.

Although in the present example the communication module 110 includes the NFC module 120 and the MST module 130, the present disclosure is not limited to these types of communication technologies. For example, the communication module 110 may include a Bluetooth module, and/or any other suitable type of short-range and/or long-range communication module.

The electronic device 101 may simultaneously or sequentially send, for example, NFC and MST signals through the communication module 110. The NFC module 120 and the MST module 130 may send payment information to the payment receiving device 102 selectively based on a transmission schedule. The NFC module 120 and the MST module 130 may selectively operate in respective time slots, thereby reducing power consumption due to a signal sending operation and preventing duplicate payment. Under this arrangement, the user does not have to take a specific action to select the communication method that is to be used for the transmission of the user's payment information, and payment may be made by bringing the electronic device 101 in proximity to a specific payment receiving device.

For example, the electronic device 101 may operate in an NFC communication-possible state based on a transmission schedule 140. In instances in which a user executes an application for payment to perform a payment process, the electronic device 101 may operate according to the transmission schedule 141. The transmission schedule 141 may include an MST time slot. When the transmission schedule 141 is used, the electronic device 101 may operate the NFC module 120 to transmit the same payment information once during an NFC time slot and may operate the MST module 130 to transmit the same payment information another time during the MST time slot.

According to various embodiments of the present disclosure, the electronic device 101 may receive first information for payment from an external device (e.g., the payment receiving device 102) and may determine a payment manner based on the first information. For example, the electronic device 101 may receive the first information which specifies the communication module that is to be used to execute a payment, from the payment receiving device 102 through a near-field communication protocol (e.g., Wi-Fi, Bluetooth, ZigBee, NFC, and the like). The electronic device 101 may then make the payment by using the module specified by the first information. In such instances, the electronic device may generate a transmission schedule based on the information that includes one or more time slots associated with the specified communication module.

Additional information about a configuration and an operation of the NFC module 120 and the MST module 130 may be given with reference to FIGS. 2 to 10.

Figure 2:
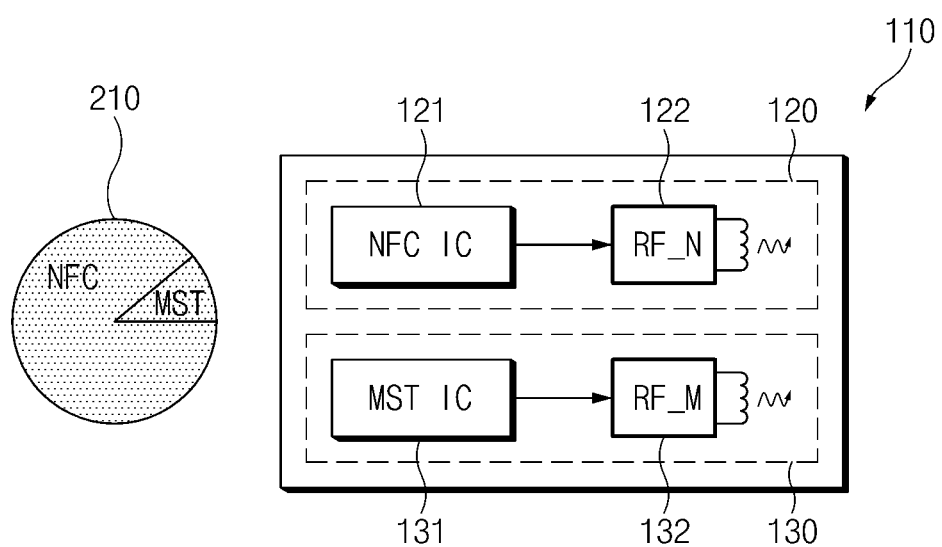
FIG. 2 is a diagram of an example of a communication module, according to various embodiments of the present disclosure.

FIG. 2 is a diagram of an example of a communication module, according to various embodiments of the present disclosure.

Referring to FIG. 2, the communication module 110 may include the NFC module 120 and the MST module 130. The NFC module 120 and the MST module 130 may send payment information to the payment receiving device 102 selectively in accordance with a transmission schedule 210.

The NFC module 120 may include an NFC control circuit 121 and an NFC antenna 122. The NFC control circuit 121 may establish a bidirectional communication channel with a payment receiving device which uses NFC. The NFC control circuit 121 may manage a polling cycle for NFC communication and may route data which is transmitted/received. The NFC antenna 122 may convert and transmit data generated by the NFC control circuit 121 into a frequency band (e.g., 13.56 MHz) fit for NFC communication.

The MST module 130 may include an MST control circuit 131 and an MST antenna 132. The MST control circuit 131 may generate and store payment information. As another example, the MST control circuit 131 may transfer payment information stored in the electronic device 101 to the MST antenna 132. The MST antenna 132 may transmit data transferred from the MST control circuit 131 using a frequency (e.g., 70 KHz) fit for MST communication. According to various embodiments of the present disclosure, the MST antenna 132 and the NFC antenna 122 may be integrated together into a single antenna unit.

The NFC module 120 and the MST module 130 may operate according to the transmission schedule 210. The transmission schedule 210 may include an NFC time slot and an MST time slot. The NFC module 120 may send payment information during the NFC time slot, and the MST module 130 may send the payment information during the MST time slot. Lengths of the NFC time slot and the MST time slot may vary according to a design or a device characteristic. For example, the length of the MST time slot may be shorter than that of the NFC time slot. This may be to reduce power consumption in light of the fact that the power consumption of the MST module 130 may be greater than that of the NFC module 120. According to another embodiment of the present disclosure, the duration of the MST time slot may be longer than that of the NFC time slot. This may be to increase the probability of successful data transmission in light of the fact that the chance of data being unsuccessfully sent when MST is used may be higher than when NFC is used.

Figure 3:
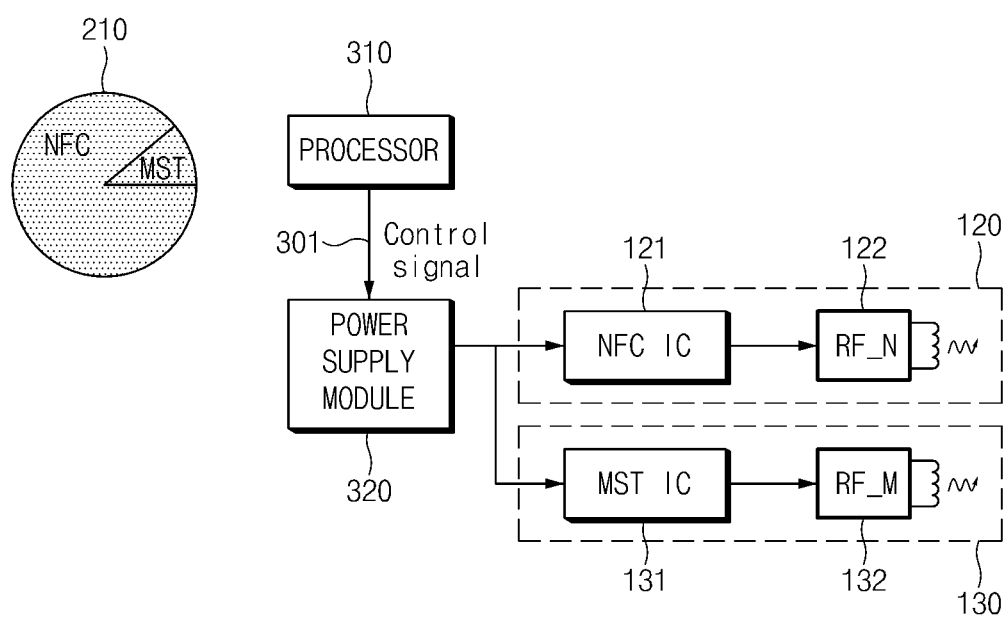
FIG. 3 is a diagram of an example of a communication module and a power control module, according to various embodiments of the present disclosure.

FIG. 3 is a diagram of an example of a communication module and a power control module, according to various embodiments of the present disclosure.

Referring to FIG. 3, the electronic device 101 may control the NFC module 120 and the MST module 130 by using a processor 310 and a power supply module 320.

The processor 310 may control the power supply module 320. The processor 310 may provide a control signal to the power supply module 320 in accordance with the transmission schedule 210. According to various embodiments of the present disclosure, the processor 310 may generate the control signal 301 in accordance with the transmission schedule 210.

The power supply module 320 (e.g., power supply) may supply power to each communication module. According to various embodiments of the present disclosure, the power supply module 320 may include a power management unit (PMU) and a battery. The power supply module 320 may selectively supply power to each module in response to the control signal 301. For example, the processor 310 may output the control signal 301 to the power supply module 320 every time the active time slot of the transmission schedule 210 (e.g., current time slot) is changed. The power supply module 320 may power on one of the modules 120 and 130 and power off the other one of the modules 120 and 130 in response to the control signal 301 in order to ensure that only the communication module associated with the active time slot (e.g., current time slot) is turned on, while the rest of the communication modules are turned off.

Alternatively, the processor 310 may control the power supply module 320 so as to supply power to the NFC module 120 and the MST module 130 at the same time. In such instances, the NFC module 120 and the MST module 130 may be supplied with power at the same time. According to various embodiments of the present disclosure, the power supply module 320 may simultaneously or sequentially supply power to each communication module.

Figure 4:
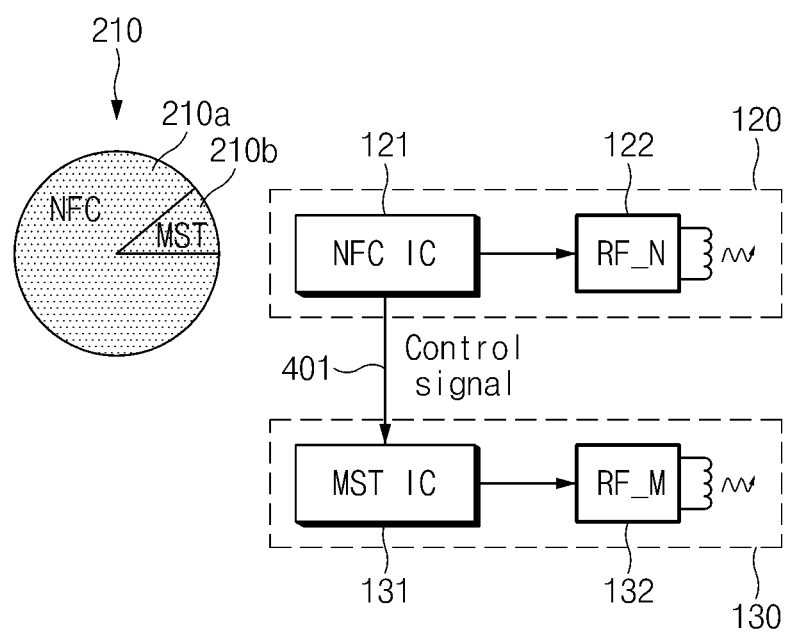
FIG. 4 is a diagram of an example of a communications module, according to various embodiments of the present disclosure.

FIG. 4 is a diagram of an example of a communications module, according to various embodiments of the present disclosure.

Referring to FIG. 4, the NFC module 120 may send a control signal 401 to the MST module 130 in accordance with the transmission schedule 210.

The NFC control circuit 121 may locally store the transmission schedule 210 or may obtain it from the memory (e.g., RAM, SSD) of the electronic device 101. In instances in which a payment operation starts, the NFC control circuit 121 may communicate with a payment receiving device through the NFC antenna 122 during an NFC time slot 210a. For example, when the NFC module 120 is in the passive mode, the NFC control circuit 121 may sense (or detect) a signal transmitted by a payment receiving device and establish a communication channel with the payment device in response. Afterwards, the NFC control circuit 121 may provide payment information such as a credit card number and the like over the communication channel.

If the NFC time slot 210a elapses without a channel for communication with the payment receiving device being established, the NFC control circuit 121 may send the control signal for operating the MST module 130 to the MST control circuit 131. The MST control circuit 131 may send payment information through the MST antenna 132 in response to an input of the control signal 401.

According to various embodiments of the present disclosure, the NFC control circuit 121 may provide to the MST control circuit 201 an indication of the duration of a time slot that is allocated to the MST control circuit 201 (e.g., 0.2 seconds) together with the control signal 401. In this case, the MST control circuit 131 may send payment information during the time slot and then may be deactivated without a separate control signal. In contrast, the NFC control circuit 121 may be deactivated during the time slot and may be activated after the time slot elapses.

The lengths of the NFC time slot and the MST time slot may be determined according to device manufacturer settings and/or user settings. Furthermore, the lengths of the NFC time slot and the MST time slot may be changed according to a characteristic of a payment receiving device or a payment attempt frequency.

Figure 5:
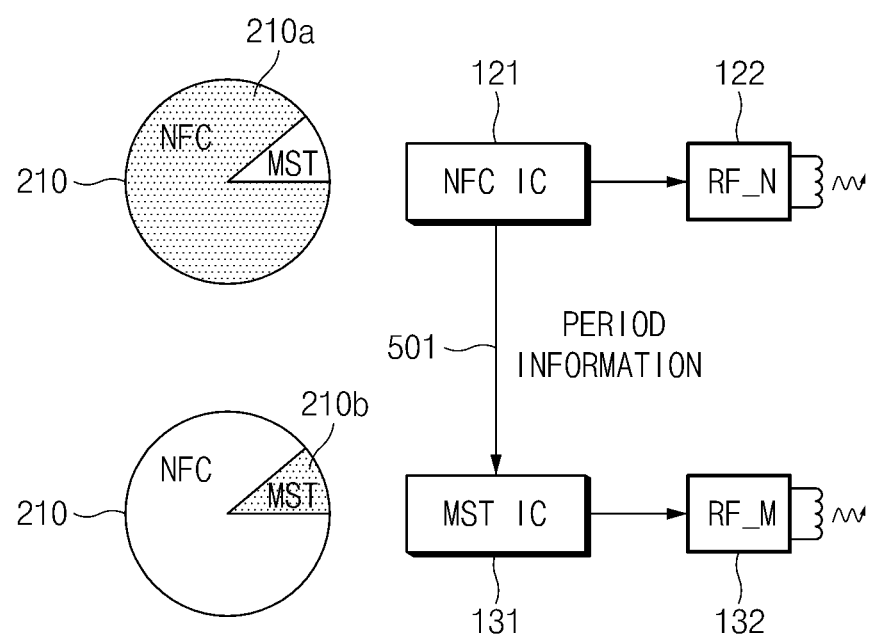
FIG. 5 is a diagram of an example of a communication module, according to various embodiments of the present disclosure.

FIG. 5 is a diagram of an example of a communication module, according to various embodiments of the present disclosure.

Referring to FIG. 5, the NFC module 120 may transmit to the MST module 130 transmission schedule information 501 which includes at least some of the transmission schedule 210. Unlike FIG. 4, the NFC module 120 may not directly control the MST module 130 and may provide transmission schedule information 501 (including information for time sync, information from which a start point in time is checked based on the time sync, information from which an end point in time is checked based on the time sync, and the like). The transmission schedule information 501 may be provided when a payment starts (e.g., a point in time when an authentication process is ended or a point in time when a user indicates his/her intention to make a payment using the electronic device 101).

The MST control circuit 131 may be activated according to the received transmission schedule 501 during the MST time slot 210b. The MST control circuit 131 may send payment information to an external payment receiving device through the MST antenna 132 during the MST time slot 210b and may be deactivated when the MST time slot 210b elapses.

As noted above, the NFC module 120 and the MST module 130 may share information associated with the transmission schedule 210 and may be alternately activated and deactivated without additional signal exchange.

According to various embodiments of the present disclosure, in instances in which a communication channel with a payment receiving device is established by one of the NFC module 120 and the MST module 130, the module used to establish the communication channel may send a signal for limiting the operation of the other one, thereby preventing duplicate payment and reducing power consumption. For example, the signal may be transferred to the MST module 130 when the NFC module 120 establishes the communication channel. Additionally or alternatively, the signal may be transferred to the NFC module 120 when the MST module 130 is selected to execute a payment operation. In some embodiments, the signal for limiting the operation of the NFC module may include any suitable type of signal that causes the NFC module to be at least partially deactivated. For example, the signal may cause the NFC module to be powered off or enter a sleep state.

According to various embodiments of the present disclosure, the NFC module 120 (or a processor in the electronic device 101) may provide the MST module with transmission schedule information. The transmission schedule information may include an indication of a duration of a time slot allocated to the MST module 130 for the transmission of payment information.

Figure 6A:
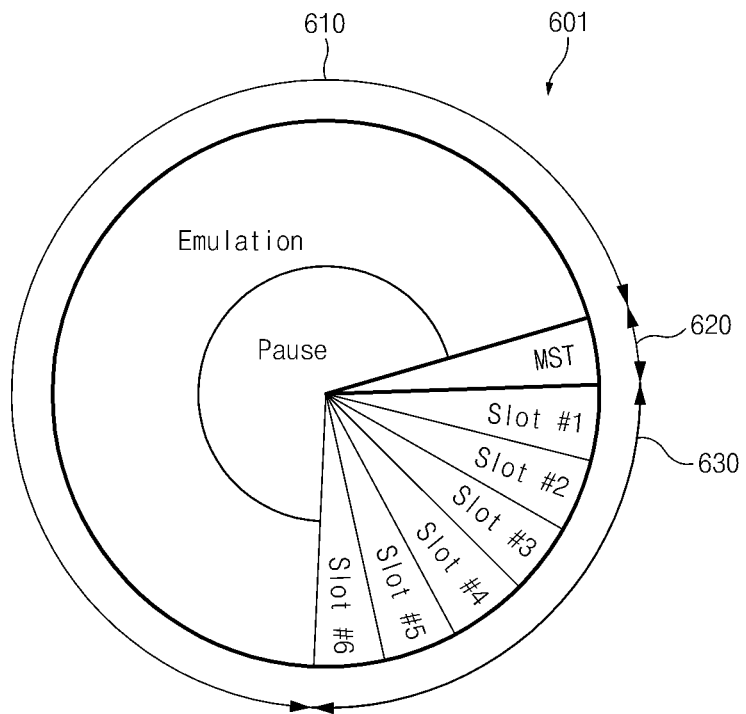
FIG. 6A is a diagram of an example of a transmission schedule, according to various embodiments of the present disclosure.
Figure 6B:
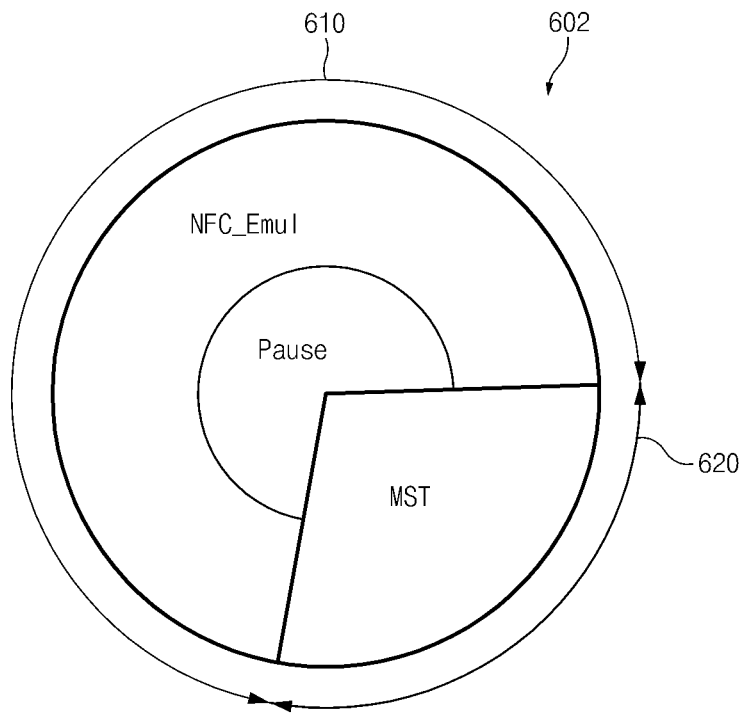
FIG. 6B is a diagram of an example of a transmission schedule, according to various embodiments of the present disclosure.

FIGS. 6A and 6B are diagrams of examples of different transmission schedules.

FIG. 6A is a diagram illustrating a transmission schedule corresponding to an active NFC mode, according to various embodiments of the present disclosure.

Referring to FIG. 6A, a transmission schedule 601 may include a passive NFC time slot 610, an MST time slot 620, and an active NFC time slot 630.

The passive NFC time slot 610 may be a time slot where the NFC module 120 is operated in passive mode. In the passive NFC time slot 610, the NFC module 120 may detect a signal from the payment receiving device and establishing a communication channel with the payment receiving device in response. Afterwards, the NFC module 120 may transmit payment information over the established channel The MST time slot 620 may be a time slot in which the NFC module 120 is deactivated, and payment information is sent via the MST module 130. A length of the MST time slot 620 may be shorter than that of the passive NFC time slot 610 or the active NFC time slot 630, in light of the fact that power consumption of the MST communication manner is greater than that of the NFC communication manner. A length of the MST time slot 620 may be longer than that of the passive NFC time slot 610 or the active NFC time slot 630 in order to increase the probability of successful transmission of the data via MST.

The active NFC time slot 630 may be a time slot in which the NFC module 120 is operated in the active mode to establish a channel with a payment receiving device and transmit payment information over the established channel. The active NFC time slot 630 may include a plurality of different time slots, each corresponding to a different one of a plurality of payment receiving devices.

FIG. 6B is a diagram of an example of a transmission schedule corresponding to a passive NFC mode, according to various embodiments of the present disclosure.

Referring to FIG. 6B, the transmission schedule 602 may include a passive NFC time slot 610 and an MST time slot 620. Unlike the transmission schedule 601, the transmission schedule 602 may not include the active NFC time slot 630. For example, in instances in which a user indicates his/her intention to start a payment using the electronic device 101, the electronic device 1010 may automatically set a transmission schedule not to include the active NFC time slot 610.

The NFC module 120 may be activated during the passive NFC time slot 610 and may be deactivated when the passive NFC time slot 610 elapses. In contrast, the MST module 130 may be activated in the MST time slot 620 and may be deactivated when the MST time slot 620 elapses.

FIGS. 6A and 6B are provided only as an example. As can be readily appreciated, the number and duration of any time slot in a given transmission schedule may vary according to a type of payment receiving device, communication protocol, and power consumption of each module.

Figure 7A:
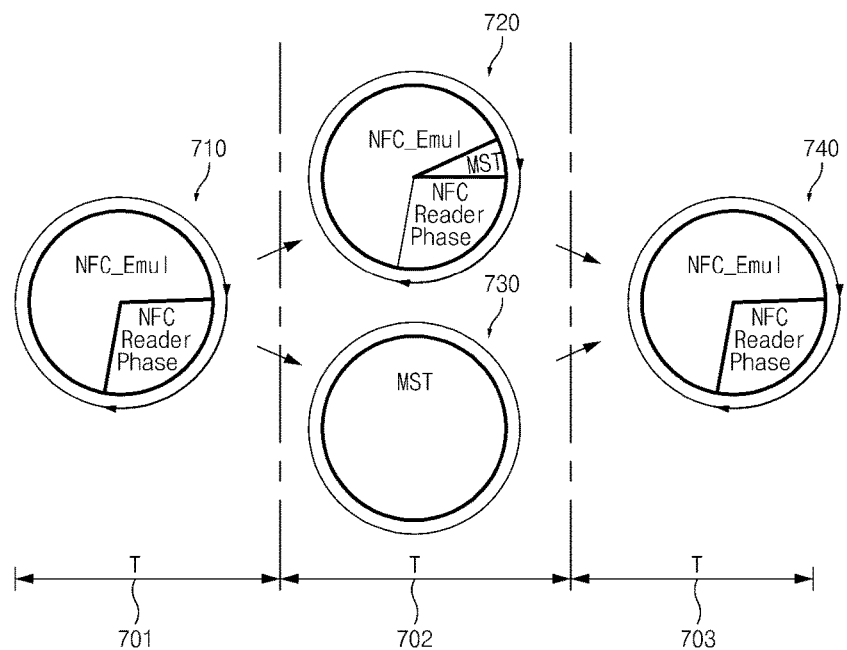
FIG. 7A is a diagram of an example of a transmission window, according to various embodiments of the present disclosure.
Figure 7B:
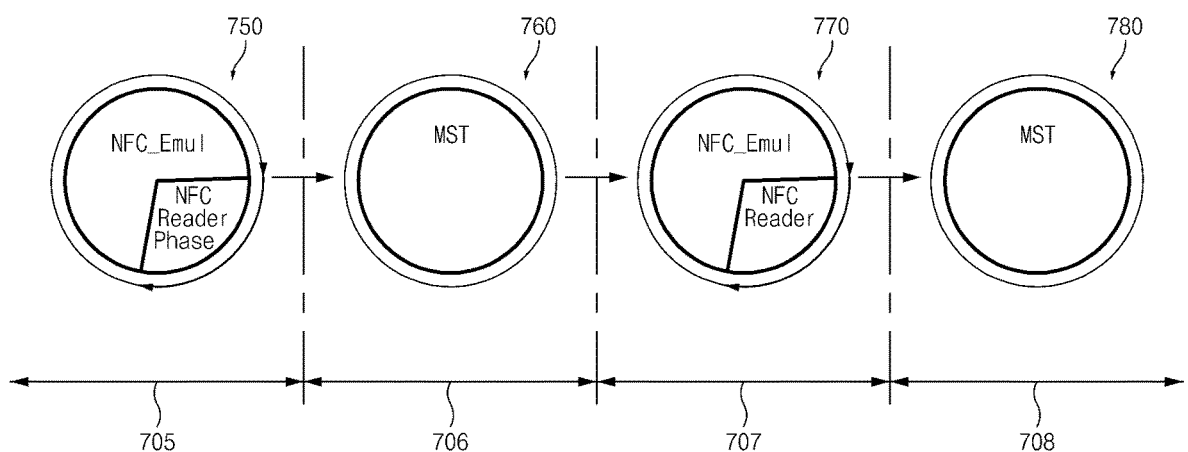
FIG. 7B is a diagram of an example of a transmission window, according to various embodiments of the present disclosure

FIGS. 7A and 7B are diagrams of different transmission windows.

Referring to FIG. 7A, an example of a transmission window is shown that includes transmission periods 701, 702, and 703. Each of the transmission periods 701, 702, 703 may be associated with a respective transmission schedule. More particularly, the transmission schedule 710 may be assigned to a first period 701. The transmission schedule 710 may include a passive NFC time slot and an MST time slot. The NFC module 120 may be activated in the passive NFC time slot, and the MST module 130 may be activated in the MST time slot.

A transmission schedule 720 may be assigned to a second period 702. The transmission schedule 720 may include a passive NFC time slot, an MST time slot, and an active NFC time slot. Alternatively, a transmission schedule 730 may be assigned to the second period 702 instead of the transmission schedule 720. As illustrated, the transmission schedule 730 may include an MST time slot only. In some embodiments, a processor may assign the transmission schedule 710 or 720 selectively to the second time slot 702 based on a specific condition (e.g., a user setting, a state of a battery, a communication environment, and the like).

Like the first time slot 701, a transmission schedule 740 including a passive NFC time slot and an MST time slot may be placed in a third time slot 703.

Referring to FIG. 7B, an example of a transmission window is shown that includes transmission periods 705, 706, 707, and 708. Each of the transmission periods 705, 706, 707, and 708 may be associated with a respective transmission schedule. As illustrated, the processor may place the NFC period and the MST period sequentially and may operate the NFC module 120 or the MST module 130. The transmission schedule 710 or 720 may be selectively assigned to the second period 702.

A transmission schedule 750 may be assigned to a first time slot 705. The transmission schedule 750 may include a passive NFC time slot and an active NFC time slot without the MST time slot. During the transmission schedule 750, the NFC module 120 may be activated, while the MST module 130 may be deactivated.

A transmission schedule 760 may be assigned to a second period 706. The transmission schedule 760 may include an MST time slot only. During the transmission schedule 760, the MST module 130 may be activated, while the NFC module 120 may be deactivated.

A transmission schedule 770 may be assigned to a third period 707. The transmission schedule 770 may be the same as the transmission schedule 750 of the first period 705. A transmission schedule 780 may be assigned to a fourth time slot 708. The transmission schedule 780 may be the same as the transmission schedule 760 of the second period 706.

Figure 8A:
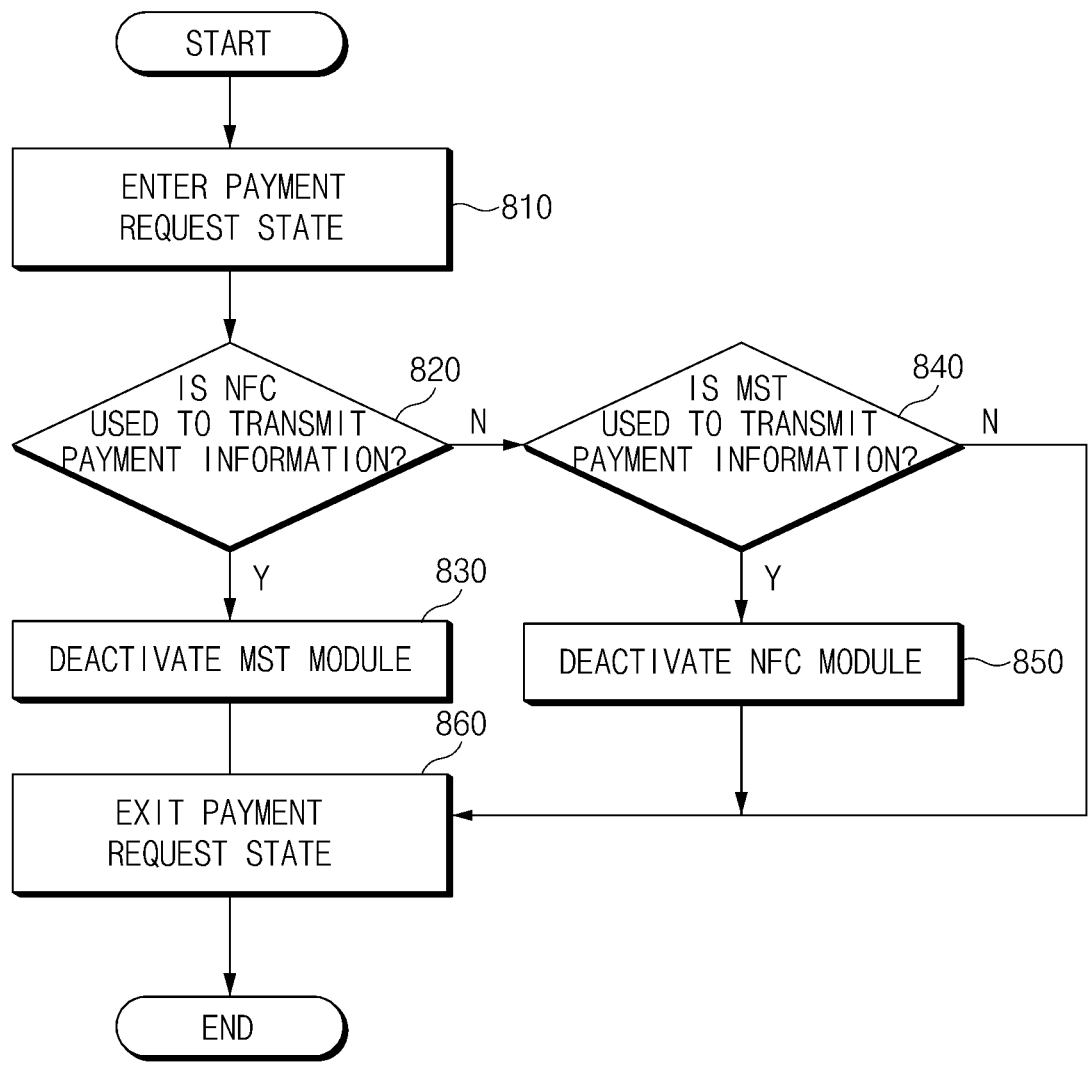
FIG. 8A is a flowchart of an example of a process, according to various embodiments of the present disclosure.

FIG. 8A is a flowchart of an example of a process, according to various embodiments of the present disclosure.

Referring to FIG. 8A, in operation 810, the electronic device 101 may enter a payment request state. In instances in which the electronic device 101 approaches a payment receiving device within a specific distance, in instances in which a specific function is executed, and/or in instances in which a specific application is executed, the electronic device 101 may enter the payment request state. For example, a user may execute an application for payment and may select a credit card to be used for payment. The user may input a password or a fingerprint to perform an authentication process.

According to various embodiments of the present disclosure, the electronic device 101 may enter the payment request state in response to detecting an external device (e.g., the payment receiving device 102). For example, the electronic device 101 may recognize the payment receiving device 102 through local area communication (e.g., Wi-Fi, Bluetooth, ZigBee, NFC, and the like) and may execute an application capable of sending payment information. According to various embodiments of the present disclosure, if an event associated with a payment request is generated (e.g., execution of an application for payment, selection of a payment menu in an application for payment, execution of an authentication process in an application for payment, or recognition of an external payment receiving device), a processor may modify the transmission schedule that is designated for use in the transmission of payment information by replacing a part of an NFC time slot with an MST time slot. For example, the processor may replace a part of an active NFC time slot with an MST time slot or may place a part of the passive NFC time slot with an MST time slot.

According to various embodiments of the present disclosure, the transmission of payment information may start when an authentication process is completed. Below, it may be assumed that the transmission schedule 210 starts from an NFC time slot. However, the scope and spirit of the present disclosure may not be limited thereto.

In operation 820, the electronic device 101 may determine whether NFC is used to transmit payment information. The NFC module 120 may operate in an active mode or a passive mode, and if an NFC channel with a payment receiving device is established, the NFC module 120 may exchange the payment information with the payment receiving device. In some implementations, determining whether NFC is used to transmit payment information may include detecting whether the active time slot (e.g., current time slot) is an NFC time slot (e.g., a time slot designated for the transmission of NFC communications).

In operation 830, the electronic device 101 may at least partially deactivate the MST module 130, thereby preventing duplicate payment and reducing power consumption. A processor may continue to supply power to the NFC module 120 and may stop supplying power to the MST module 130. According to various embodiments of the present disclosure, if a response to payment information sent from the NFC module 120 is received, in the transmission schedule 210, the processor may replace an MST time slot with an NFC time slot. If receiving a response signal from a payment receiving device through an NFC communication channel, the processor may remove the MST time slot from the transmission schedule that is being used for the transmission of the payment information to allow the NFC module 120 to continue to operate.

When the NFC time slot elapses, in operation 840, the electronic device 101 may detect whether MST is used to transmit the payment information. The MST module 130 may also be used to send payment information, such as a credit card number and the like. In some implementations, determining whether MST is used to transmit payment information may include detecting whether the active time slot (e.g., current time slot) is an MST time slot (e.g., a time slot designated for the transmission of MST communications).

In operation 850, the electronic device 101 may at least partially deactivate the NFC module 120. For example, the processor may continue to supply power to the MST module 130 and may stop supplying power to the NFC module 120. Alternatively, the electronic device 101 may not supply power to the MST module 130 and the NFC module 120 in the light of a time taken for payment information to be transferred to a server of a payment receiving device in the MST manner.

In operation 860, the electronic device 101 may exit the payment request state. If the electronic device receives information about payment completion from the payment receiving device, if a specific function or application of the electronic device 101 is ended, or if the electronic device 101 enters the payment request state and a specific time elapses, the electronic device 101 may exit the payment request state. According to various embodiments of the present disclosure, the electronic device 101 may output a payment error message if the payment process is not performed during a specific time.

Figure 8B:
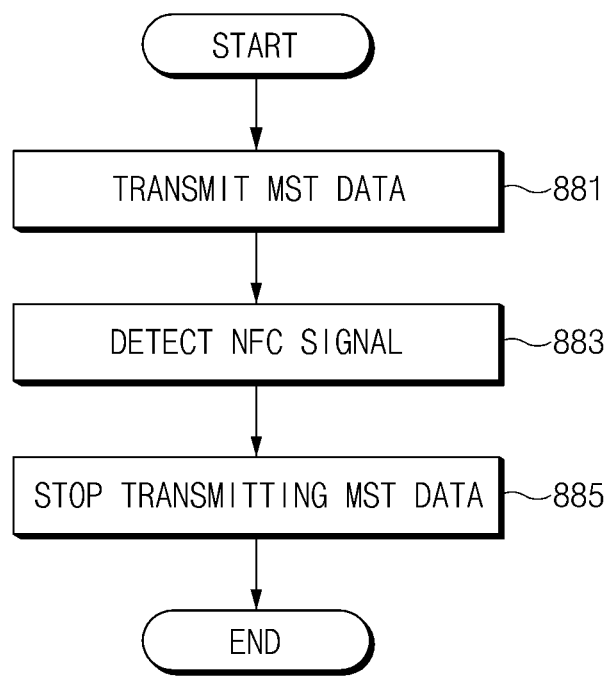
FIG. 8B is a flowchart of an example of a process, according to various embodiments of the present disclosure.

FIG. 8B is a flowchart of an example of a process, according to various embodiments of the present disclosure.

Referring to FIG. 8B, in operation 881, the electronic device 101 may send payment information through the MST module 130. Operation 881 may be performed in response to selecting a menu of a program for starting a payment function or inputting a password or a fingerprint to perform an authentication operation.

In operation 883, the electronic device 101 may detect an NFC signal from the payment receiving device 102 through the NFC module 120 while it is sending payment information via the MST module 130.

In operation 885, the electronic device 101 may stop sending payment information via the MST module 130. Before or after operation 885, the electronic device 101 may establish an NFC communication channel, which corresponds to the NFC signal of the payment receiving device 102, through the NFC module 120 and may transfer payment data through the communication channel.

According to various embodiments of the present disclosure, a payment method of an electronic device which includes an NFC module and an MST module may include selecting at least one of the NFC module or the MST module, and transmitting payment information to an external device through the at least one module thus selected. The selecting may include selecting the at least one module based on a specific order.

According to various embodiments of the present disclosure, the transmitting may include refraining from at least a part of a function, associated with a transfer of the payment information, of a module not selected from the NFC module and the MST module.

According to various embodiments of the present disclosure, the transmitting may include, if the at least one module is the MST module, stopping the transmitting through the MST module, at least based on that a signal is detected by the NFC module.

Figure 9:
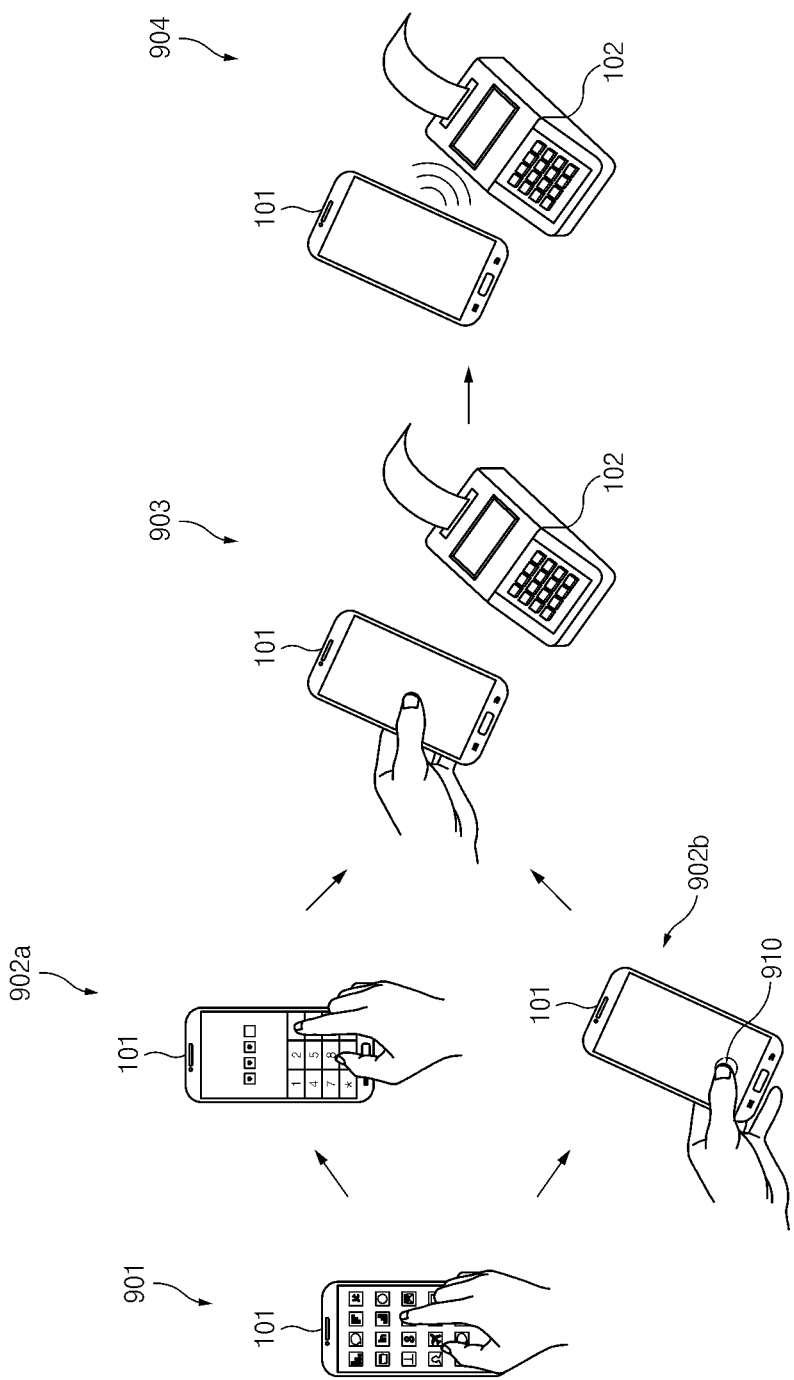
FIG. 9 is a diagram illustrating the execution of a payment process, according to various embodiments of the present disclosure.

FIG. 9 is a diagram illustrating the execution of a payment process, according to various embodiments of the present disclosure.

Referring to FIG. 9, in operation 901, the electronic device 101 may enter a payment request state. For example, the electronic device 101 may enter the payment request state if that an application for payment is driven is checked, if that authentication information of a user is received is checked, or if that the electronic device 101 approximates to the payment receiving device 102 within a distance is checked.

According to various embodiments of the present disclosure, whether the electronic device 101 approaches the payment receiving device 102 within a distance may be checked according to at least one of a method for receiving a signal from the payment receiving device 102 or a method for checking that a response to a signal from the electronic device 101 is received from the payment receiving device 102. For example, if a user is positively authenticated by the electronic device 101, the electronic device 101 may send payment-related information to the payment receiving device 102 without a separate credit card or an additional manipulation and may perform a payment process.

In operation 902*a* and operation 902*b*, the electronic device 101 may permit the user to input a password or to input a fingerprint to a fingerprint recognition unit 910 and may perform an authentication process.

In operation 903, the user may move closely the electronic device 101, not a credit card, to the payment receiving device 102 within a specific distance. The distance may be a distance (e.g., a distance of 5 cm or less) in which it is possible to recognize NFC-based or MST-based communication.

In operation 904, the electronic device 101 may send payment information to the payment receiving device 102 based in accordance with the transmission schedule 210. The NFC module 120 may be activated in the NFC time slot, and the MST module 130 may be activated in the MST time slot. The user may easily make payment without selecting or checking a communication manner.

According to various embodiments of the present disclosure, the payment receiving device 102 may provide a payment result to the electronic device 101. For example, in instances in which an NFC channel is established, the payment receiving device 102 may send a payment result through the channel. The electronic device 101 may inform the user of the payment result and may terminate the payment process. Alternatively, the payment receiving device 102 may inform the electronic device 101 of the payment result through a communication server. The electronic device 101 may inform the user of a result by using a text message or an application pop-up window. The electronic device 101 may terminate an application for payment.

According to various embodiments of the present disclosure, a payment method of an electronic device which supports payment of NFC and MST manners may include allowing the electronic device to enter a payment request state, sending payment information selectively through the NFC or MST manner based on a schedule, and releasing the payment request state.

According to various embodiments of the present disclosure, the allowing of the electronic device may include one of recognizing that the electronic device approximates to a payment receiving device within a specific distance or executing a specific function or application of the electronic device.

According to various embodiments of the present disclosure, the schedule may include an NFC time slot and an MST time slot. The sending of the payment information may include sending the payment information in the NFC manner during the NFC time slot and sending the payment information in the MST manner during the MST time slot.

The releasing of the payment request state may include at least one of receiving information about payment completion from a payment receiving device, terminating a specific function or application of the electronic device, or recognizing a lapse of a specific time after entering the payment request state. According to various embodiments of the present disclosure, a payment method of an electronic device which includes an NFC module and an MST module may include sending payment information through the MST module, detecting a signal by the NFC module, and stopping the sending of payment information via the MST module.

Figure 10:
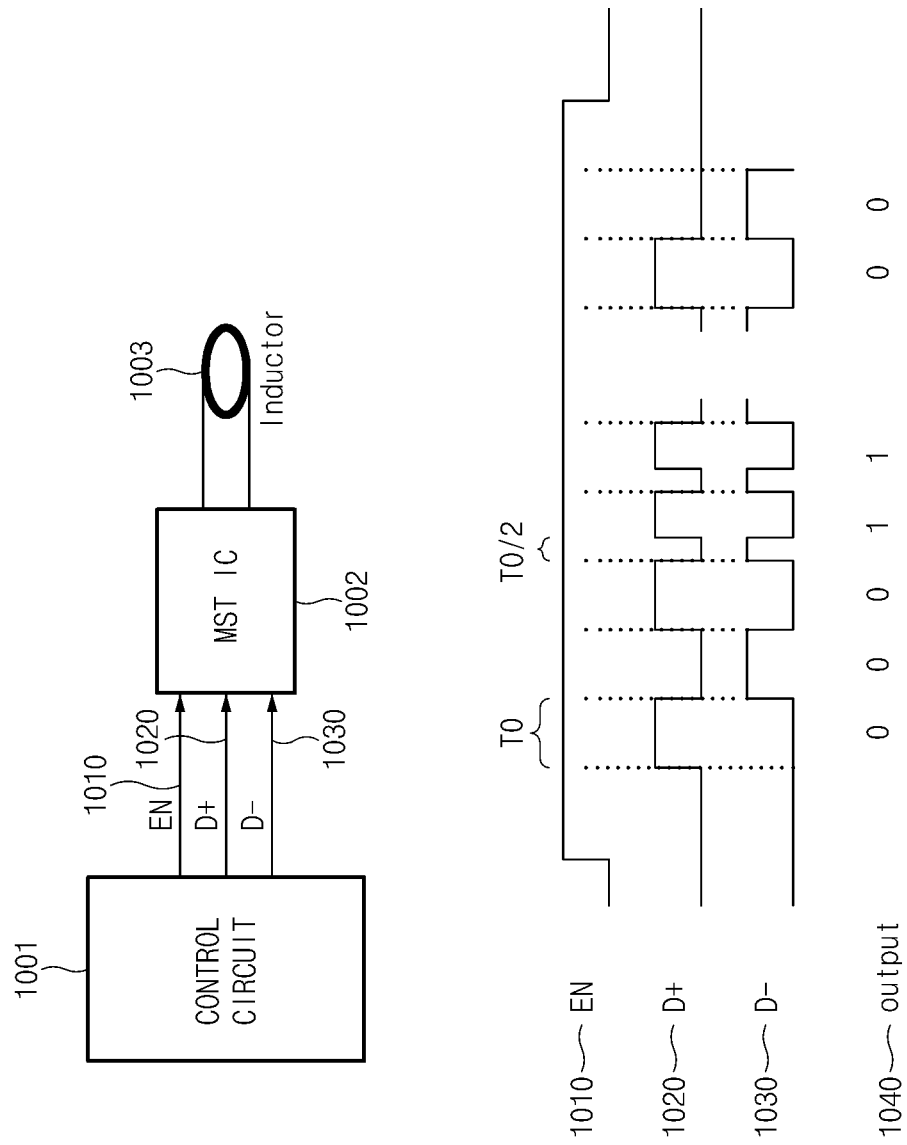
FIG. 10 is a diagram of an example of an MST module according to various embodiments of the present disclosure.

FIG. 10 is a diagram of an example of an MST module according to various embodiments of the present disclosure.

Referring to FIG. 10, the MST module 130 may receive control signals 1010 to 1030 from a control circuit 1001. The control signal 1010-1030 may encode payment information. An MST circuit 1002 may convert the payment information encoded by the control signals into a magnetic signal through an MST antenna 1003. The control circuit 1001 may output an EN signal 1010, a D+ signal 1020, and a D− signal 1030. If an MST time slot starts, the control circuit 1001 may maintain the EN signal 1010 high, thereby driving the MST circuit 1002.

When the EN signal 1010 is high, the control circuit 1001 may provide payment information, such as credit card information and the like, using the D+ signal 1020 and the D− signal 1030. A phase of the D+ signal 1020 may be opposite to that of the D− signal 1030. If states of the D+ signal 1020 and the D− signal 1030 are maintained during a specific time T0, an output value 1040 may be recognized as "0". In instances in which states of the D+ signal 1020 and the D− signal 1030 are changed during the specific time T0, the output value 1040 may be recognized as "1". The payment receiving device 102 may combine bits of the output value 1040 to recognize payment information.

According to various embodiments of the present disclosure, an electronic device may include a processor, a near-field communication (NFC) module, and a magnetic stripe data transmission (MST) module. When payment is requested, the processor may allow the NFC module or the MST module to selectively send payment information based on a schedule. The schedule may include an NFC time slot and an MST time slot. The NFC module may send the payment information in the NFC time slot, and the MST module may send the payment information in the MST time slot.

According to various embodiments of the present disclosure, an electronic device may further include a power supplying module configured to supply power to the NFC module and the MST module. The processor may allow the power to be selectively supplied to the NFC module or the MST module based on the schedule.

According to various embodiments of the present disclosure, the NFC module may be configured to provide a control signal, which causes the MST module to send payment information, to the MST module if the NFC time slot elapses. After transmitting the control signal, the NFC communication module may stop sending the payment information during the MST time slot.

According to various embodiments of the present disclosure, the NFC communication module may provide a control signal, which causes the MST module to stop sending payment information, to the MST module if the MST time slot elapses and may activate sending of payment information through the NFC module. The NFC communication module may provide the MST module with information about a duration time of the MST time slot together with the control signal, and the MST module may be configured to send payment information during the duration time.

According to various embodiments of the present disclosure, the NFC module may provide the MST module with information about the MST time slot, and the MST module may send payment information during the MST time slot.

According to various embodiments of the present disclosure, if a response to the sending of the payment information through the NFC module is received, the processor may replace the MST time slot with the NFC time slot in the schedule. The NFC time slot may include a passive NFC time slot or an active NFC time slot.

According to various embodiments of the present disclosure, if an event associated with the payment request is generated, the processor may be configured to replace at least a part of the NFC time slot with the MST time slot. The NFC time slot may include a passive NFC time slot and an active NFC time slot. If the event is generated, the processor may be configured to replace a part of the active NFC time slot with the MST time slot.

According to various embodiments of the present disclosure, the schedule may include a first period including a passive NFC time slot and an MST time slot, a second period including an passive NFC time slot and an active NFC time slot, and a third period including an MST time slot. The processor may cause the payment information to be sent in a communication manner corresponding to one of the first period, the second period, and the third period.

According to various embodiments of the present disclosure, an electronic device may include a first communication module configured to request payment in a first communication manner and a second communication module configured to request a payment in a second communication manner of which a frequency band is different from a frequency band of the first communication manner. The control module may cause the payment to be requested using the first communication manner and the second communication manner, based on a specific schedule.

According to various embodiments of the present disclosure, the specific schedule may include a first time slot in which a signal is sent in the first communication manner and a second time slot in which a signal is sent in the second communication manner. If a response to a signal sent in the first time slot is not received, the processor may cause the payment to be requested in the second communication manner during the second time slot. If a response to a signal sent in the first time slot is received, the processor may cause a signal to be sent in the first communication manner during the second time slot.

Figure 11:
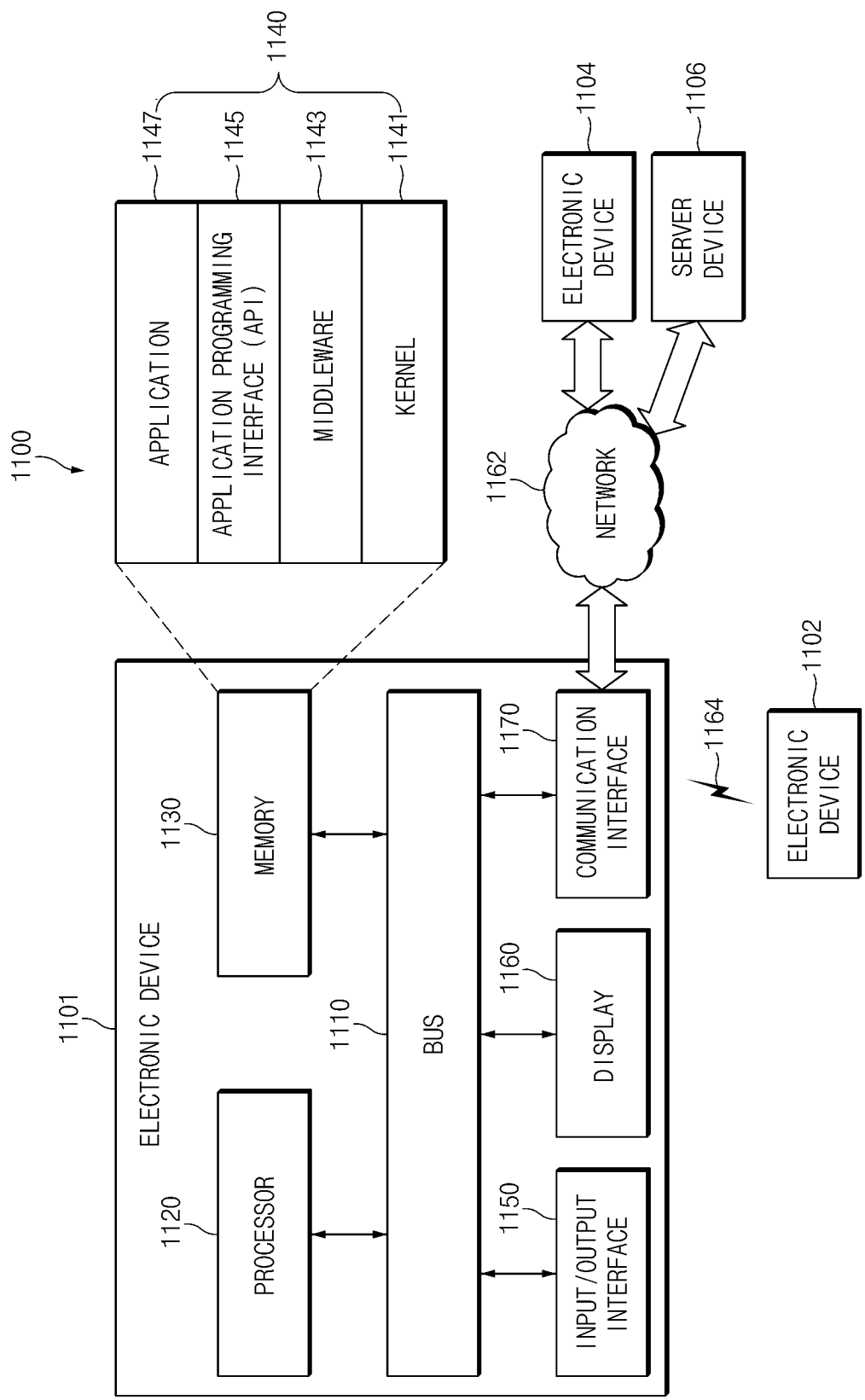
FIG. 11 is a diagram illustrating an electronic device in a network environment, according to various embodiments of the present disclosure.

FIG. 11 is a diagram illustrating an electronic device in a network environment, according to various embodiments of the present disclosure.

Referring to FIG. 11, there is illustrated an electronic device 1101 in a network environment 1100 according to various embodiments of the present disclosure. The electronic device 1101 may include a bus 1110, a processor 1120, a memory 1130, an input/output (I/O) interface 1150, a display 1160, and a communication interface 1170. According to an embodiment of the present disclosure, the electronic device 1101 may not include at least one of the above-described components or may further include other component(s). The electronic device 1101 may be, for example, the electronic device 101 of FIG. 1.

The bus 1110 may interconnect the above-described components 1110 to 1170 and may be a circuit for conveying communications (e.g., a control message and/or data) among the above-described components.

The processor 1120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 1120 may perform, for example, data processing or an operation associated with control or communication of at least one other component(s) of the electronic device 1101.

The memory 1130 may include any suitable type of volatile or non-volatile memory, such as Random Access Memory (RAM), Read-Only Memory (ROM), Network Accessible Storage (NAS), cloud storage, a Solid State Drive (SSD), etc. The memory 1130 may store instructions or data associated with at least one other component(s) of the electronic device 1101. According to various embodiments of the present disclosure, the memory 1130 may store software and/or a program 1140. The program 1140 may include, for example, a kernel 1141, a middleware 1143, an application programming interface (API) 1145, and/or an application (or an application program) 1147. At least a portion of the kernel 1141, the middleware 1143, or the API 1145 may be called an "operating system (OS)".

The kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete components of the electronic device 1101 so as to control or manage system resources.

The middleware 1143 may perform a mediation role such that the API 1145 or the application program 1147 communicates with the kernel 1141 to exchange data.

Furthermore, the middleware 1143 may process task requests received from the application program 1147 according to a priority. For example, the middleware 1143 may assign the priority, which makes it possible to use a system resource (e.g., the bus 1110, the processor 1120, the memory 1130, or the like) of the electronic device 1101 to at least one of the application program 1147. For example, the middleware 1143 may process the one or more task requests according to the priority assigned to the at least one, which makes it possible to perform scheduling or load balancing on the one or more task requests.

The API 1145 may be an interface through which the application program 1147 controls a function provided by the kernel 1141 or the middleware 1143, and may include, for example, at least one interface or function (e.g., an instruction) for a file control, a window control, image processing, a character control, or the like.

The I/O interface 1150 may transmit an instruction or data, input from a user or another external device, to other component(s) of the electronic device 1101. Furthermore, the I/O interface 1150 may output an instruction or data, received from other component(s) of the electronic device 1101, to a user or another external device.

The display 1160 may include, for example, a liquid crystal display (LCD), a light-emitting diode (LED) display, an organic LED (OLED) display, or a microelectromechanical systems (MEMS) display, or an electronic paper display. The display 1160 may display, for example, various contents (e.g., text, an image, a video, an icon, a symbol, and the like) to a user. The display 1160 may include a touch screen and may receive, for example, a touch, gesture, proximity, or hovering input using an electronic pen or a portion of a user's body.

The communication interface 1170 may establish communication between the electronic device 1101 and an external electronic device (e.g., a first external electronic device 1102, a second external electronic device 1104, or a server 1106). For example, the communication interface 1170 may be connected to a network 1162 through wireless communication or wired communication to communicate with the external device (e.g., a second external electronic device 1104 or a server 1106).

The wireless communication may include at least one of, for example, LTE, LTE-A, CDMA, WCDMA, UMTs, WiBro, GSM. Furthermore, the wireless communication may include, for example, a local area network 1164. The local area network 1164 may include, for example, at least one of Wi-Fi, Bluetooth, near field communication (NFC), global positioning system (GPS), or the like. In instances in which the electronic device 1101 is the electronic device 101 of FIG. 1, the local area network 1164 may be the communication module 110 for providing payment information. In this case, the local area network 1164 may include the MST communication module 130. The wired communication may include at least one of, for example, a universal serial bus (USB), a high definition multimedia interface (HDMI), a recommended standard-1132 (RS-1132), or a plain old telephone service (POTS). The network 1162 may include at least one of telecommunications networks, for example, a computer network (e.g., LAN or WAN), the Internet, or a telephone network.

Each of the first and second external electronic devices 1102 and 1104 may be a device of which the type is different from or the same as that of the electronic device 1101. According to an embodiment of the present disclosure, the server 1106 may include a group of one or more servers. According to various embodiments of the present disclosure, all or a part of operations that the electronic device 1101 will perform may be executed by another or plural electronic devices (e.g., the electronic devices 1102 and 1104 or the server 1106). According to an embodiment of the present disclosure, in instances in which the electronic device 1101 executes any function or service automatically or in response to a request, the electronic device 1101 may not perform the function or the service internally, but, alternatively additionally, it may request at least a portion of a function associated with the electronic device 1101 at other device (e.g., the electronic device 1102 or 1104 or the server 1106). The other electronic device (e.g., the electronic device 1102 or 1104 or the server 1106) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
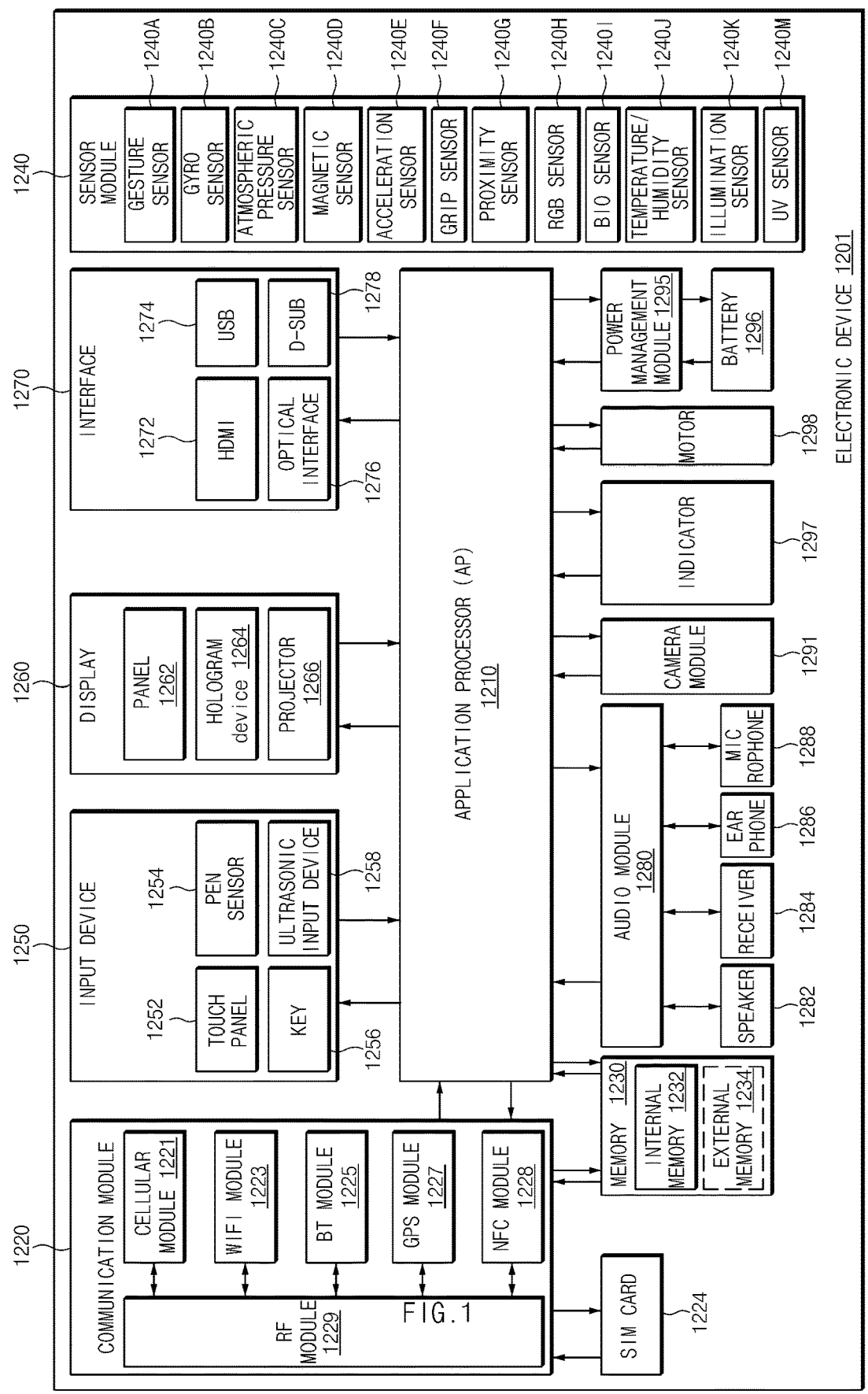
FIG. 12 is a block diagram illustrating an example of an electronic device, according to various embodiments of the present disclosure.

FIG. 12 is a block diagram illustrating an example of an electronic device 1201 according to various embodiments of the present disclosure. An electronic device 1201 may be the electronic device 101 of FIG. 1.

Referring to FIG. 12, an electronic device 1201 may include, for example, all or a part of an electronic device 1101 illustrated in FIG. 11. The electronic device 1201 may include one or more processors (e.g., an AP, a graphics processor, and the like) 1210, a communication module 1220, a subscriber identification module 1224, a memory 1230, a sensor module 1240, an input device 1250, a display 1260 (e.g., the display 160), an interface 1270, an audio module 1280, a camera module 1291, a power management module 1295, a battery 1296, an indicator 1297, and a motor 1298.

The processor 1210 may drive an operating system (OS) or an application to control a plurality of hardware or software components connected to the processor 1210 and may process and compute a variety of data. The processor 1210 may be implemented with a System on Chip (SoC), for example. According to an embodiment of the present disclosure, the processor 1210 may further include a graphic processing unit (GPU) and/or an image signal processor. The processor 1210 may include at least a part (e.g., a cellular module 1221) of components illustrated in FIG. 12. The processor 1210 may load and process an instruction or data, which is received from at least one of other components (e.g., a nonvolatile memory), and may store a variety of data in nonvolatile memory.

The communication module 1220 may be configured the same as or similar to a communication interface 1170 of FIG. 11. The communication module 1220 may include a cellular module 1221, a wireless-fidelity (Wi-Fi) module 1223, a Bluetooth (BT) module 1225, a global positioning system (GPS) module 1227, a near field communication (NFC) module 1228, and a radio frequency (RF) module 1229.

The cellular module 1221 may provide voice communication, video communication, a character service, an Internet service or the like through a communication network. According to an embodiment of the present disclosure, the cellular module 1221 may perform discrimination and authentication of an electronic device 1201 within a communication network using a subscriber identification module 1224 (e.g., a SIM card), for example. According to an embodiment of the present disclosure, the cellular module 1221 may perform at least a portion of functions that the processor 1210 provides. According to an embodiment of the present disclosure, the cellular module 1221 may include a communication processor (CP).

Each of the Wi-Fi module 1223, the BT module 1225, the GPS module 1227, and the NFC module 1228 may include a processor for processing data exchanged through a corresponding module, for example. According to an embodiment of the present disclosure, at least a portion (e.g., two or more components) of the cellular module 1221, the Wi-Fi module 1223, the BT module 1225, the GPS module 1227, and the NFC module 1228 may be included within one Integrated Circuit (IC) or an IC package.

The RF module 1229 may transmit and receive a communication signal (e.g., an RF signal). The RF module 1229 may include a transceiver, a power amplifier module (PAM), a frequency filter, a low noise amplifier (LNA), an antenna, or the like. According to various embodiments of the present disclosure, at least one of the cellular module 1221, the Wi-Fi module 1223, the BT module 1225, the GPS module 1227, or the NFC module 1228 may transmit and receive an RF signal via a separate RF module.

The subscriber identification module 1224 may include, for example, a subscriber identification module and may include unique identity information (e.g., integrated circuit card identifier (ICCID)) or subscriber information (e.g., integrated mobile subscriber identity (IMSI)).

The memory 1230 (e.g., a memory 1030) may include an internal (or embedded) memory 1232 or an external memory 1234. For example, the internal memory 1232 may include at least one of a volatile memory (e.g., a dynamic random access memory (DRAM), a static RAM (SRAM), or a synchronous DRAM (SDRAM)), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid-state drive (SSD).

The external memory 1234 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1234 may be functionally and/or physically connected to the electronic device 1201 through various interfaces.

The sensor module 1240 may measure, for example, a physical quantity or may detect an operation state of the electronic device 1201. The sensor module 1240 may convert the measured or detected information to an electrical signal. The sensor module 1240 may include at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a living body sensor 1240I, a temperature/humidity sensor 1240J, an illuminance sensor 1240K, or an UV sensor 1240M. Although not illustrated, additionally or generally, the sensor module 1240 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1240 may further include a control circuit for controlling at least one or more sensors included therein. According to an embodiment of the present disclosure, the electronic device 1201 may further include a processor which is a part of the processor 1210 or independent of the processor 1210 and is configured to control the sensor module 1240. The processor may control the sensor module 1240 while the processor 1210 remains in a sleep state.

The input device 1250 may include, for example, a touch panel 1252, a (digital) pen sensor 1254, a key 1256, or an ultrasonic input unit 1258. The touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, and the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., a display 1060) may include a panel 1262, a hologram device 1264, or a projector 1266. The panel 1262 may be configured the same as or similar to a display 1160 of FIG. 11. The panel 1262 and the touch panel 1252 may be integrated into a single module. The hologram device 1264 may display a stereoscopic image in a space using a light interference phenomenon. The projector 1266 may project light onto a screen so as to display an image. The screen may be arranged on the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI (high-definition multimedia interface) 1272, a USB (universal serial bus) 1274, an optical interface 1276, or a D-sub (D-subminiature) 1278. The interface 1270 may be included, for example, in a communication interface 1170 illustrated in FIG. 11. Additionally or generally, the interface 1270 may include, for example, a mobile high-definition link (MHL) interface, an SD card/multi-media card (MMC) interface, or an infrared data association (IrDA) standard interface.

The audio module 1280 may convert a sound and an electrical signal in dual directions. At least a portion of the audio module 1280 may be included, for example, in an input/output interface 1150 illustrated in FIG. 11. The audio module 1280 may process, for example, sound information that is input or output through a speaker 1282, a receiver 1284, an earphone 1286, or a microphone 1288.

The camera module 1291 for shooting a still image or a video may include, for example, at least one image sensor (e.g., a front sensor or a rear sensor), a lens, an image signal processor (ISP), or a flash (e.g., an LED or a xenon lamp).

The power management module 1295 may manage, for example, the power supply of the electronic device 1201. According to an embodiment of the present disclosure, a power management integrated circuit (PMIC) a charger IC or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery or a solar battery.

The indicator 1297 may display a specific state of the electronic device 1201 or a portion thereof (e.g., a processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted, or other additional elements may be added. Furthermore, some of the elements of the electronic device according to various embodiments of the present disclosure may be combined with each other so as to form one entity, so that the functions of the elements may be performed in the same manner as before the combination.

According to various embodiments of the present disclosure, an electronic device may include a near field communication (NFC) module, a magnetic stripe data transmission (MST) module, and a processor functionally connected with the NFC module and the MST module, wherein the processor is configured to select at least one module of the NFC module or the MST module, and transmit payment information to an external device through the at least one module thus selected. The processor may be configured to select the at least one module based on a specific order.

According to various embodiments of the present disclosure, the specific order may include a first order and a second order, and the processor may be configured to select the NFC module at the first order and the MST module at the second order. The second order may include an active section of the NFC module.

According to various embodiments of the present disclosure, the electronic device may include at least one power supplying module configured to supply power to the NFC module and the MST module. The processor may be configured to selectively supply the power to the NFC module or the MST module.

According to various embodiments of the present disclosure, if the MST module is selected, the processor may be configured to refrain from at least a part of a function of the NFC module associated with a transfer of the payment information at least momentarily. If the NFC module is selected, the processor may be configured to refrain from at least a part of a function of the MST module associated with a transfer of the payment information at least momentarily.

According to various embodiments of the present disclosure, the processor may be configured to receive a request associated with the payment information from the external device, and assign, if the request corresponds to a specific event, at least a part of the active section of the NFC module to an operating section for a transfer of the payment information.

According to various embodiments of the present disclosure, an electronic device may include a first communication module configured to use a first communication protocol, a second communication module configured to use a second communication protocol, and a processor functionally connected with the first communication module and the second communication module. The processor may be configured to select at least one of the first communication module or the second communication module, and send payment information to an external device through the selected at least one module.

According to various embodiments of the present disclosure, the processor may be configured to select another module if no response corresponding to the at least one module is received from the external device within a specific time. The first communication module or the processor may be configured to provide setting information associated with a transfer of the payment information to the second communication module. The setting information may include a duration time of the second communication module associated with a transfer of the payment information.

According to various embodiments of the present disclosure, an electronic device may include an NFC module configured to transmit or receive payment information, and an MST module configured to selectively transmit the payment information to an external device. The NFC module and the MST module may be formed in the same chip. The electronic device may further include one or more processors configured to control at least a part of a function of the NFC module or the MST module in regard to a transfer of the payment information.

Figure 13:
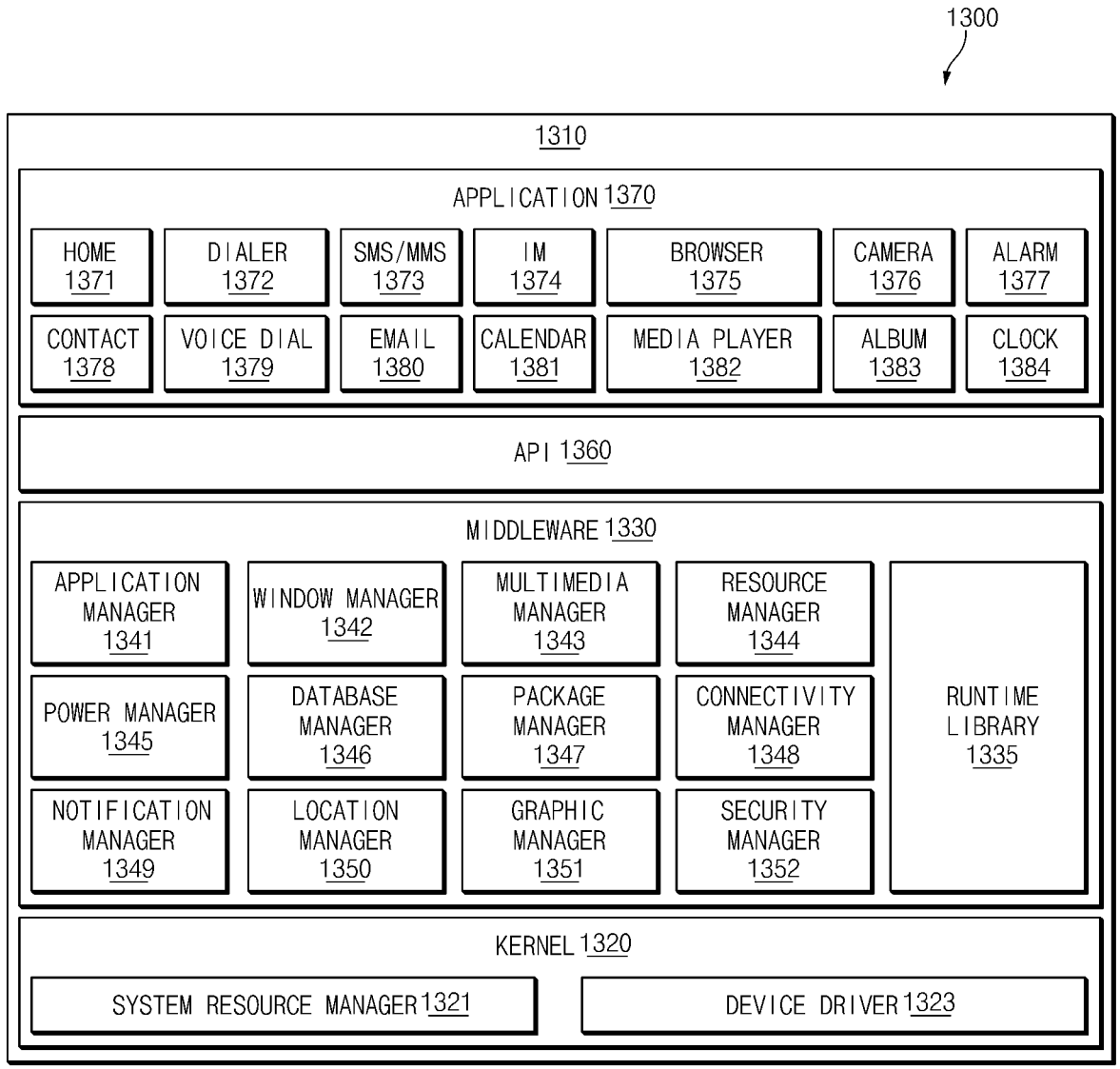
FIG. 13 is a block diagram of an example of a program module 1310, according to various embodiments of the present disclosure.

FIG. 13 is a block diagram of an example of a program module 1310, according to various embodiments of the present disclosure.

Referring to FIG. 13, according to an embodiment of the present disclosure, a program module 1310 (e.g., a program 140) may include an operating system (OS) to control resources associated with an electronic device (e.g., the electronic device 101 or the electronic device 1101), and/or diverse applications (e.g., an application program 147) driven on the OS. The OS may be, for example, android, iOS, windows, Symbian, Tizen, or Bada.

The program module 1310 may include a kernel 1320, a middleware 1330, an application programming interface (API) 1360, and/or an application 1370. At least a part of the program module 1310 may be preloaded on an electronic device or may be downloadable from an external electronic device (e.g., an electronic device 1102 or 1104, a server 1106, and the like).

The kernel 1320 (e.g., the kernel 1141) may include, for example, a system resource manager 1321 or a device driver 1323. The system resource manager 1321 may perform control, allocation, or retrieval of system resources. According to an embodiment of the present disclosure, the system resource manager 1321 may include a process managing part, a memory managing part, or a file system managing part. The device driver 1323 may include, for example, a display driver, a camera driver, a Bluetooth driver, a common memory driver, a USB driver, a keypad driver, a Wi-Fi driver, an audio driver, or an inter-process communication (IPC) driver.

The middleware 1330 may provide, for example, a function which the application 1370 needs in common, or may provide diverse functions to the application 1370 through the API 1360 to allow the application 1370 to efficiently use limited system resources of the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include, for example, a library module which is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a GUI resource which is displayable on a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database which is to be used in at least one application of the application 1370. The package manager 1347 may install or update an application which is distributed in the form of a package file.

The connectivity manager 1348 may manage, for example, wireless connection such as Wi-Fi or Bluetooth. The notification manager 1349 may display or notify an event such as arrival message, promise, or proximity notification in a mode that does not disturb a user. The location manager 1350 may manage location information of an electronic device. The graphic manager 1351 may manage a graphic effect that is displayed on a screen, or manage a user interface related to the display of graphic effects. The security manager 1352 may provide a general security function necessary for system security or user authentication. According to an embodiment of the present disclosure, in instances in which an electronic device (e.g., the electronic device 1101) includes a telephony function, the middleware 1330 may further include a telephony manager for managing a voice or video call function of the electronic device.

The middleware 1330 may include a middleware module that combines diverse functions of the above-described components. The middleware 1330 may provide a module specialized to each OS kind to provide differentiated functions. Additionally, the middleware 1330 may remove a part of the preexisting components, dynamically, or may add a new component thereto.

The API 1360 (e.g., the API 1145) may be, for example, a set of programming functions and may be provided with a configuration which is variable depending on an OS. For example, in instances in which an OS is Android or the iOS, it may be permissible to provide one API set per platform. In instances in which an OS is the Tien, it may be permissible to provide two or more API sets per platform.

The application 1370 (e.g., the application program 1147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, am album 1383, and a timepiece 1384, or for offering health care (e.g., measuring an exercise quantity or blood sugar) or environment information (e.g., atmospheric pressure, humidity, or temperature).

According to an embodiment of the present disclosure, the application 1370 may include an application (hereinafter referred to as "information exchanging application" for descriptive convenience) to support information exchange between the electronic device (e.g., the electronic device 1101) and an external electronic device (e.g., the electronic device 1102 or 1104). The information exchanging application may include, for example, a notification relay application for transmitting specific information to the external electronic device, or a device management application for managing the external electronic device.

For example, the information exchanging application may include a function of transmitting notification information, which arises from other applications (e.g., applications for SMS/MMS, e-mail, health care, or environmental information), to an external electronic device (e.g., the electronic device 1102 or 1104). Additionally, the information exchanging application may receive, for example, notification information from an external electronic device and may provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1102 or 1104) which communicates with the electronic device, an application running in the external electronic device, or a service (e.g., a call service or a message service) provided from the external electronic device.

According to an embodiment of the present disclosure, the application 1370 may include an application (e.g., a health care application) which is assigned in accordance with an attribute (e.g., an attribute of a mobile medical device as a kind of electronic device) of the external electronic device (e.g., the electronic device 1102 or 1104). According to an embodiment of the present disclosure, the application 1370 may include an application which is received from an external electronic device (e.g., the server 1106 or the electronic device 1102 or 1104). According to an embodiment of the present disclosure, the application 1370 may include a preloaded application or a third party application which is downloadable from a server. The component titles of the program module 1310 according to the embodiment of the present disclosure may be modifiable depending on kinds of OSs.

According to various embodiments of the present disclosure, at least a portion of the program module 1310 may be implemented using software, firmware, hardware, or a combination of two or more thereof. At least a portion of the program module 1310 may be implemented (e.g., executed), for example, by a processor (e.g., the processor 1210). At least a portion of the program module 1310 may include, for example, modules, programs, routines, sets of instructions, or processes, or the like for performing one or more functions.

The term "module" used herein may represent, for example, a unit including one or more combinations of hardware, software, and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable logic device for performing some operations, which are known or will be developed.

At least a portion of an apparatus (e.g., modules or functions thereof) or a method (e.g., operations) according to various embodiments of the present disclosure may be, for example, implemented by instructions stored on a computer-readable storage media in the form of a program module. The instruction, when executed by one or more processors (e.g., the processor 210), may cause the one or more processors to perform a function corresponding to the instruction. The computer-readable storage media, for example, may be the memory 230.

A computer-readable recording medium may include a hard disk, a magnetic media, a floppy disk, a magnetic media (e.g., a magnetic tape), an optical media (e.g., a compact disc read-only memory (CD-ROM) and a digital versatile disc (DVD), a magneto-optical media (e.g., a floptical disk), and hardware devices (e.g., a read-only memory (ROM), a random-access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, an electronic device may selectively make payment, which is based on an NFC manner or an MST manner, using various time periods, thereby making it possible for a user to make payment easily without a separate checking or selecting procedure.

According to various embodiments of the present disclosure, an electronic device may selectively make payment, which is based on an NFC manner or an MST manner, using various time periods, thereby making it possible to efficiently manage power consumption of each communication module.

According to various embodiments of the present disclosure, an electronic device may selectively make payment, which is based on an NFC manner or an MST manner, using various time periods, thereby making it possible to cope with various communication environments.

FIGS. 1-12 are provided as an example only. At least some of the operations discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. It will further be understood that the phrase "incident light sample" may refer to a sample of light that is incident on a sensor taking the sample and/or a sample of light that is incident on an imaging sensor.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
a near field communication (NFC) circuit;
a magnetic stripe data transmission (MST) circuit; and
at least one processor functionally coupled to the NFC circuit and the MST circuit, wherein the processor is configured to:
execute an application for payment;
perform an authentication process of a user;
when the authentication process authenticates the user, start a payment process using the NFC circuit or the MST circuit, wherein the payment process is a function of the application;
activate the NFC circuit to transmit a NFC signal associated with payment information to an external device during the payment process;
activate the MST circuit to transmit a MST signal associated with the payment information to the external device during the payment process while the NFC signal is transmitted;
deactivate the MST circuit based at least in part on a response signal received from the external device according to the NFC signal via the NFC circuit;
terminate the payment process;
select at least one of the NFC circuit and the MST circuit according to a predetermined time schedule comprising a plurality of time slots, wherein during a first time slot of the plurality of time slots, the MST circuit is selected and during a second time slot of the plurality of time slots, the NFC circuit is selected and operated in an active mode, and
wherein the NFC circuit is configured to transmit an activation signal to the MST circuit, and the MST circuit is configured to activate responsive to the activation signal from the NFC circuit.

2. The electronic device of claim 1, wherein the processor is configured to:
in response to the response signal, assign another time schedule to the NFC module to continue transmitting the payment information.

3. The electronic device of claim 1, further comprising:
at least one power supplying module configured to supply power to the NFC module and the MST module.

4. The electronic device of claim 3, wherein the processor is configured to selectively supply power to the NFC module or the MST module.

5. The electronic device of claim 1, wherein when the MST signal transmitted by the MST module, the processor is configured to at least partially deactivate the NFC module.

6. The electronic device of claim 1, wherein when the NFC signal transmitted by the NFC module, the processor is configured to at least partially deactivate the MST module.

7. The electronic device of claim 1, wherein the at least one processor is configured to:
convert the payment information into a magnetic signal; and
transmit, using the MST module, the magnetic signal as at least part of the MST signal.

8. The electronic device of claim 1, wherein the NFC signal transmitted by the NFC module is generated based on at least one of ISO/IEC 14443A/MIFARE, ISO/IEC 1444313, ISO/IEC 15693/ICODE, FeliCa, or JEWEL/TOPAZ.

9. The electronic device of claim 1, wherein the MST signal transmitted by the MST module comprises a magnetic signal to be recognized by a credit card reader.

10. The electronic device of claim 1, wherein the response signal comprises information indicating that a payment based on the payment information is completed.

11. The electronic device of claim 1, wherein the at least one processor is configured to receive a user input to be used to authenticate the user of the electronic device before transmitting the NFC signal.

12. The electronic device of claim 11, further comprising a touchscreen, and wherein the at least one processor is configured to:
receive, via the touchscreen, a password from the user, as at least part of the user input.

13. The electronic device of claim 11, further comprising a biometric sensor, and wherein the at least one processor is configured to:
receive, via the biometric sensor, a biometric information of the user, as at least part of the user input.

14. The electronic device of claim 1, wherein the activation signal includes an indication of a duration of the first time slot that is allocated to the MST module, and wherein the MST module is configured to activate for the duration of the first time slot.

15. A method for making a payment in an electronic device, the method comprising:
executing an application for payment by at least one processor;
performing an authentication process of a user by the at least one processor;
when the authentication process authenticates the user, starting a payment process using a near field communication (NFC) circuit or a magnetic stripe data transmission (MST) circuit, wherein the payment process is a function of the application;
activating the NFC circuit to transmit a NFC signal associated with payment information to an external device during the payment process;
activating the MST circuit to transmit a MST signal associated with the payment information to the external device during the payment process while the NFC signal is transmitted;
deactivating the MST circuit based at least in part on a response signal received from the external device according to the NFC signal via the NFC circuit;
terminating the payment process by the at least one processor;
selecting at least one of the NFC circuit and the MST circuit according to a predetermined time schedule comprising a plurality of time slots, wherein during a first time slot of the plurality of time slots, the MST circuit is selected and during a second time slot of the plurality of time slots, the NFC circuit is selected and operated in an active mode, and
wherein the NFC circuit is configured to transmit an activation signal to the MST circuit, and the MST circuit is configured to activate responsive to the activation signal from the NFC circuit.

* * * * *